No. 821,756. PATENTED MAY 29, 1906.
C. F. SMITH.
FOOD CHOPPER.
APPLICATION FILED AUG. 13, 1904.

Witnesses.
L. D. Bigelow
P. J. Egan

Inventor.
Charles F. Smith
By James Shepard Atty.

UNITED STATES PATENT OFFICE.

CHARLES F. SMITH, OF NEW BRITAIN, CONNECTICUT, ASSIGNOR TO LANDERS, FRARY AND CLARK, OF NEW BRITAIN, CONNECTICUT, A CORPORATION.

FOOD-CHOPPER.

No. 821,756.

Specification of Letters Patent.

Patented May 29, 1906.

Application filed August 13, 1904. Serial No. 220,636.

*To all whom it may concern:*

Be it known that I, CHARLES F. SMITH, a citizen of the United States, residing at New Britain, in the county of Hartford and State of Connecticut, have invented certain new and useful Improvements in Food-Choppers, of which the following is a specification.

My invention relates to improvements in food-choppers; and the main object of my improvement is efficiency in the cutting operation.

Figure 1:
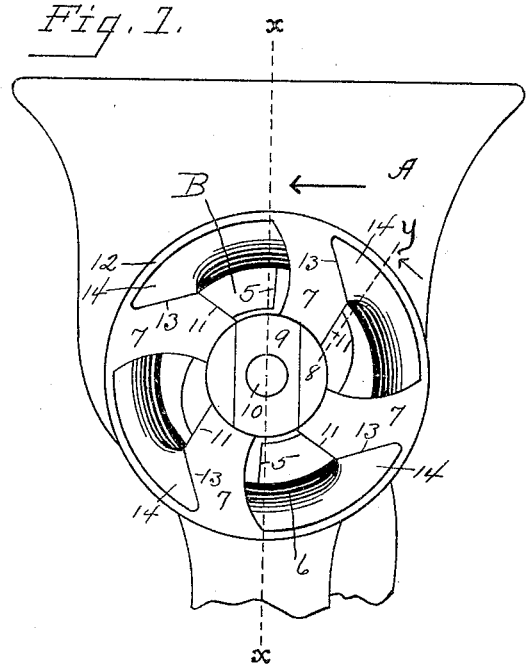
Figure 3:
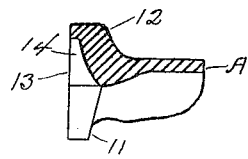
Figure 2:
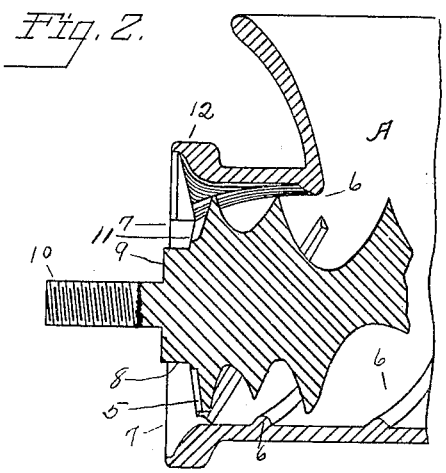
Figure 4:
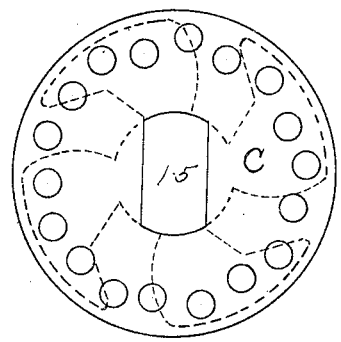

In the accompanying drawings, Figure 1 is an end view of my food-chopper with the perforated plate and its nut removed, the standard being represented as broken off. Fig. 2 is a broken-off sectional view of the same on the line $xx$ of Fig. 1. Fig. 3 is a detail section of a portion of the case on the line $y$ of Fig. 1. Fig. 4 is a face view of the perforated plate, together with broken contour lines of the cutting-arms of the case.

The main portion of the case A and the forcer B may be of any ordinary construction. The delivery end of the forcer is provided with two cutting-teeth 5 5 at the terminals of its threads, the cutting edges of the said teeth extending in substantially a radial direction, as shown in Fig. 1. The forcer also has the driving portion 9 for carrying a rotary plate or cutter and a screw-threaded portion 10 to receive a nut to hold said cutter in place. A forcer of this construction is old and well known.

The case is provided with ordinary feeding-ribs 6 and four cutting-arms 7, preferably formed integral with the case and with their inner ends fitted to bear directly on the short cylindrical portion 8 of the screw without any bearing-ring, the same, generally speaking, being also old. The novelty of my machine resides in the shape of these arms at their cutting edges, together with the shape of the case adjacent to the outer ends of the said arms and the relations of the said arms to the perforated plate C.

The front or cutting edges 11 of the inner ends of the arms 7 extend outwardly in a straight line with a somewhat forward slant to or nearly to the periphery of the forcer and are for being acted upon by the cutting-teeth 5 of the forcer B, the inner face of the said arms and the outer face of the said teeth being fitted to each other in the ordinary manner. The case A is provided with an enlargement 12 at the delivery end, within which is the flaring mouth or delivery between the outer ends of the cutting-arms. These outer ends have straight cutting edges 13 arranged at an angle to the cutting edges 11 and which slant forwardly at a greater incline than the said edges 11. The spaces between the inner cutting edges 11 and the confronting faces or edges of the adjacent cutting-arms 7 are open in the longitudinal direction of the machine, while the spaces between the outer ends of the said arms are formed with shallow pockets 14 immediately adjacent to the cutting edges 13, the depth of which pockets longitudinally of the case being less than the thickness in the same direction of the cutting-arms 7.

The perforated plate C has a driving-opening 15 to receive the driving portion 9 of the forcer, and its holes or perforations are arranged near the outer edge, so as to coact only with the outer cutting edges 13 of the arms 7. The said perforated plate is held on the forcer by means of an ordinary thumb-nut, (not shown,) which is screwed upon the threaded portion 10 of the forcer.

The meat or other material forced through the spaces between the inner ends of the arms is cut off by the coaction of the teeth on the end of the forcer and the cutting edges 11 of the arms 7 at the inner face of the said arms. The material so cut off flows outwardly beyond the periphery of the forcer, where it reaches the holes in the perforated plate, filling the said holes as the mass of material is forced against the back or inner face of the said plate. Some of the material now travels with the said plate and is carried against the outer cutting edges 13 to sever the material within the holes of the plate from the material at the back of the plate. In so doing the material back of the plate is carried into the shallow pocket, where it is backed by the solid wall of said pocket, so that it cannot escape, and is severed with a keen cut.

I claim as my invention—

1. The combination of a forcer, having cutting-teeth on its delivery end with a perforated plate mounted on the said forcer, and the case having a series of cutting-arms arranged inside of the said perforated plate and outside the outer end of the forcer, with the inner ends of the said arms having cutting edges extended within the diameter of the said forcer for coacting with the teeth thereon, the said case having an enlarged delivery extending radially beyond the diameter of the said forcer, the outer ends of the said arms having cutting edges that slant forwardly and outwardly, and which with the said enlarged delivery of the case form confining-pockets at the outer ends of the said arms, the said pockets being made shallow in the longitudinal direction of the case by means of a wall of the said enlargement which closes the said pockets on that side which is opposite the face of the said perforated plate.

2. The combination of a forcer having cutting-teeth at its end with a perforated plate driven by the said forcer, and a case having cutting-arms between the said teeth and plate and extending outwardly beyond the diameter of the forcer, the inner ends of the said arms having cutting edges arranged in a circle of about the same diameter as the forcer and their outer ends having cutting edges arranged at an angle to said inner cutting edges and in a circle outside of the said inner cutting edges, substantially as described.

3. The combination of the case having cutting-arms at the delivery end with inner cutting edges at the inner ends of the said arms, with a forcer rotating within the said case and having cutting-teeth at its outer end coacting with the said inner cutting edges at the inner ends of the said arms and operating to do all of their cutting within the diameter of the said forcer, the said arms of the case having also outer cutting edges at their outer ends arranged for cutting on a circle outside of the circle occupied by the said inner cutting edges, and a perforated plate which is imperforate in front of the inner cutting edges at the inner ends of the said arms, and provided with perforations outside the circle occupied by the said inner cutting edges and operating to do all of its cutting outside of the circle within which all the cutting is done at the inner edges of the said arms.

CHARLES F. SMITH.

Witnesses:
C. I. HILL,
LEROY H. PAGE.